US010162500B2

(12) United States Patent
Zearing (10) Patent No.: US 10,162,500 B2
(45) Date of Patent: Dec. 25, 2018

(54) DYNAMICALLY RENDER LARGE DATASET IN CLIENT APPLICATION

(71) Applicant: MICROSOFT TECHNOLOGY LICENSING, LLC, Redmond, WA (US)

(72) Inventor: David Zearing, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 15/245,213

(22) Filed: Aug. 24, 2016

(65) Prior Publication Data
US 2018/0059916 A1    Mar. 1, 2018

(51) Int. Cl.
G06F 3/0484  (2013.01)
G06F 3/0483  (2013.01)
G06F 3/0485  (2013.01)
G06F 17/30   (2006.01)

(52) U.S. Cl.
CPC ........ G06F 3/04845 (2013.01); G06F 3/0483 (2013.01); G06F 3/04855 (2013.01); G06F 17/30899 (2013.01)

(58) Field of Classification Search
CPC ...... G06T 11/00; G06T 11/60; G06F 3/04845; G06F 3/04855; G06F 3/0483; G06F 3/0485; G06F 17/30861; G06F 17/30899; G06F 17/30905
USPC ........................................................ 345/661
See application file for complete search history.

(56) References Cited

U.S. PATENT DOCUMENTS

| 7,441,047 | B2 | 10/2008 | Gibbs et al. |
| 7,694,233 | B1* | 4/2010 | Ording ................. G06F 3/0481 715/788 |
| 7,761,812 | B2 | 7/2010 | Ostojic et al. |
| 8,429,521 | B2 | 4/2013 | Lloyd et al. |
| 8,434,018 | B2 | 4/2013 | Tapuska |
| 8,775,506 | B2 | 7/2014 | Evans et al. |
| 8,887,085 | B1 | 11/2014 | Cox et al. |
| 9,218,267 | B1 | 12/2015 | Keller |
| 9,336,753 | B2 | 5/2016 | Leventhal et al. |
| 2005/0289450 | A1 | 12/2005 | Bent et al. |
| 2006/0085741 | A1 | 4/2006 | Weiner et al. |
| 2009/0106687 | A1 | 4/2009 | De souza sana et al. |

(Continued)

OTHER PUBLICATIONS

Maeda, et al., "Webdigest: Layout-Preserving Visually Enhanced Web Pages", In Proceedings of the Symposium on Applications and the Internet, Jan. 27, 2003, 4 Pages.

(Continued)

*Primary Examiner* — Sae Won Yoon
(74) *Attorney, Agent, or Firm* — Talem IP Law, LLP (57) ABSTRACT

Dynamic rendering of a large dataset is provided. A client application initiates operations to dynamically render the large dataset by identifying and retrieving an initial page of items from the large dataset to render in a visible area. The initial page of items is dynamically sized while rendering. A consumed section of the visible area is measured to determine utilization by the initial page of items. Adjacent pages of items are also retrieved from the large dataset to render in a remaining section of the visible area determined based on the consumed section. The adjacent pages of items are rendered in the remaining section of the visible area.

16 Claims, 7 Drawing Sheets

(56) References Cited

U.S. PATENT DOCUMENTS

| | | | |
|---|---|---|---|
| 2009/0327952 A1* | 12/2009 | Karas | G06F 3/0485 715/786 |
| 2009/0327965 A1 | 12/2009 | Averett et al. | |
| 2010/0153544 A1 | 6/2010 | Krassner et al. | |
| 2010/0269152 A1 | 10/2010 | Pahlavan et al. | |
| 2011/0258575 A1 | 10/2011 | Cupp et al. | |
| 2012/0011430 A1 | 1/2012 | Parker et al. | |
| 2012/0110499 A1 | 5/2012 | Hance et al. | |
| 2012/0159393 A1 | 6/2012 | Sethi | |
| 2013/0103738 A1* | 4/2013 | Evans | H04L 29/08072 709/203 |
| 2013/0174016 A1 | 7/2013 | Glazer et al. | |
| 2013/0187944 A1* | 7/2013 | Hamana | G06F 3/0483 345/619 |
| 2014/0129966 A1 | 5/2014 | Kolesnikov et al. | |
| 2014/0237370 A1 | 8/2014 | Canitz | |
| 2015/0007108 A1 | 1/2015 | Ozcelik | |
| 2015/0149889 A1* | 5/2015 | Yang | G06F 3/0485 715/234 |
| 2015/0199324 A1 | 7/2015 | Nishioka | |
| 2015/0213117 A1 | 7/2015 | Bailie et al. | |
| 2016/0070434 A1 | 3/2016 | Clark et al. | |
| 2016/0070457 A1 | 3/2016 | Furtwangler et al. | |
| 2016/0070682 A1 | 3/2016 | Furtwangler et al. | |
| 2018/0088758 A1 | 3/2018 | Zearing | |

OTHER PUBLICATIONS

"International Search Report and Written Opinion Issued in PCT Application No. PCT/US2017/047462", dated Oct. 4, 2017, 13 Pages.

"Manage caching of large dataset in resource limited browser (mobile)", Published on: Oct. 16, 2015, Available at: http://stackoverflow.com/questions/31826859/manage-caching-of-large-dataset-in-resource-limited-browser-mobile.

"Optimizing Performance:Controls", Retrieved from https://docs.microsoft.com/en-us/dotnet/framework/wpf/advanced/optimizing-performance-controls, Dec. 25, 2011, 3 Pages.

"International Search Report and Written Opinion Issued in PCT Application No. PCT/US2017/051679", dated Nov. 24, 2017, 13 Pages.

* cited by examiner

DYNAMICALLY RENDER LARGE DATASET IN CLIENT APPLICATION

BACKGROUND

Information collection, management, and analysis have changed work processes and associated data management. Automation and improvements in work processes have expanded scope of capabilities offered by businesses. With the development of faster and smaller electronics, execution of mass processes at data analysis systems have become feasible. Indeed, analysis work at data centers, data warehouses, data workstations have become common business features in modern work environments. Such systems provide a wide variety of applications such as web browsers that present data management tools. Many such applications present large datasets to attempt to improve consumption of big data. Big data gathering and presentation consumes significant resources and performance at a promise of improved processes and condensed task flows.

Data presentation techniques are becoming ever more important as big data grows in popularity across the computer industry. Varieties of techniques are necessary for presenting large data quantities found in big data, to facilitate mining of the relevant insights, and (ultimately) to deliver the benefit of relevant insights to stakeholders. There are currently significant gaps within data presentation methods employed when dealing with large datasets. Lack of easy to use data presentation methods lead to underutilization of collected large datasets.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to dynamically rendering a large dataset in a client application. The client application, according to embodiments, may initiate operations to render the large dataset by identifying and retrieving an initial page of items from a large dataset to render in a visible area. The initial page of items may be rendered in the visible area. A content of the initial page of items may be dynamically sized. Next, a consumed section of the visible area may be measured. Adjacent page(s) of items may be retrieved from the large dataset to render in a remaining section of the visible area determined based on the consumed section. Furthermore, the adjacent page(s) of items may be rendered in the remaining section of the visible area.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a client application may dynamically render a large dataset. In an example scenario, the client application, which may include a web browser, may identify and retrieve an initial page of items of a large dataset to render in a visible area. For example, the items may be selected and retrieved from a beginning of the large dataset. Alternatively, a previously rendered page of items may be used to generate the initial page of items upon detecting a continued action associated with a previous interaction with the previously rendered page.

Next, the client application may measure a consumed section of a visible area utilized by the initial page of items. Furthermore, adjacent page(s) of items may be retrieved from the large dataset to render in a remaining section of the visible area determined based on the consumed section. The consumed section may be compared to the remaining section to detect how many adjacent page(s) of items may fit the remaining section. The adjacent page(s) of items may be rendered in the remaining section of the visible area.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to dynamically render a large dataset in a client application. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1:
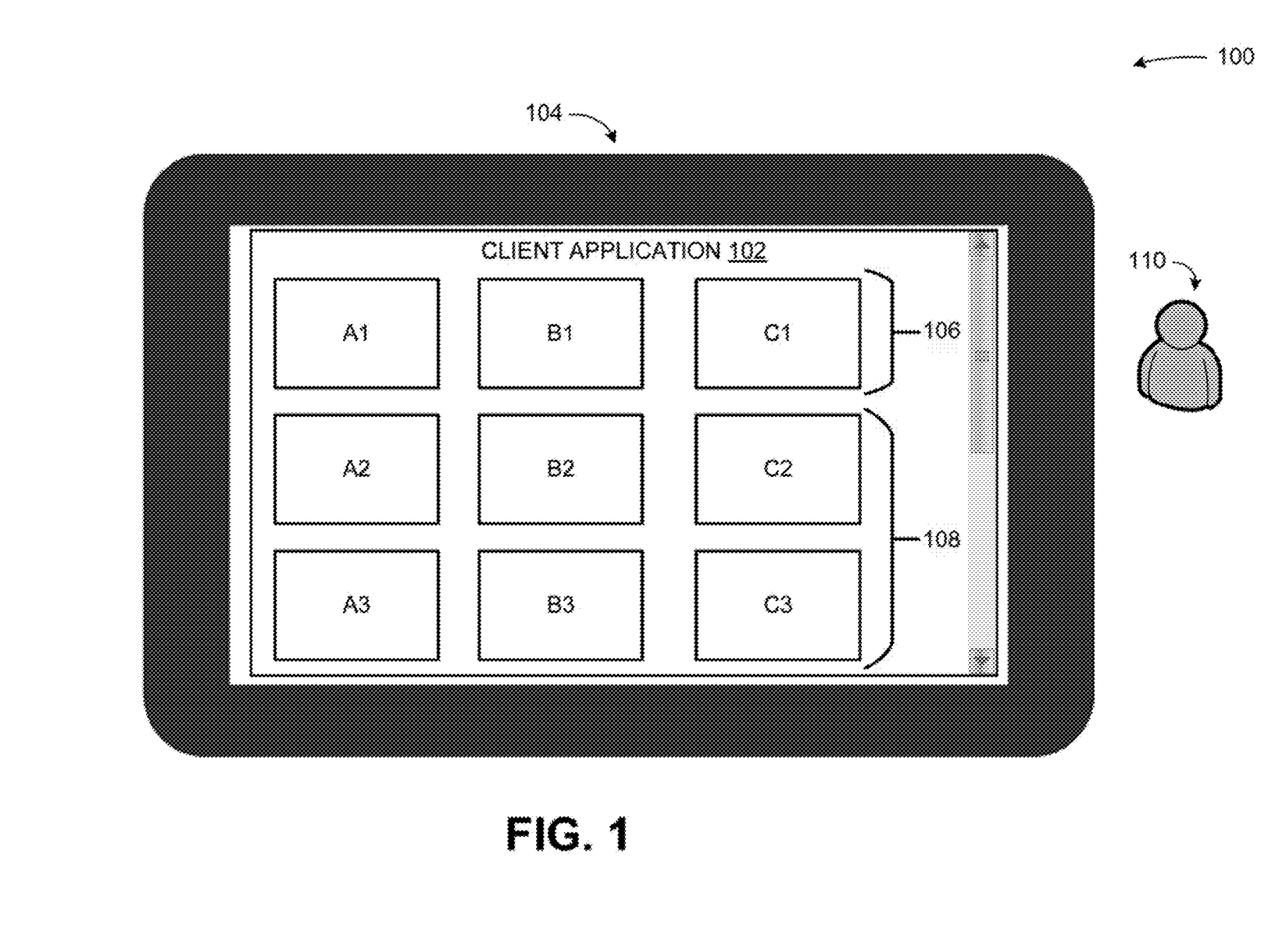
FIG. 1 is a conceptual diagram illustrating an example of rendering a large dataset in a client application, according to embodiments.

FIG. 1 is a conceptual diagram illustrating examples of dynamically rendering a large dataset in a client application, according to embodiments.

In a diagram 100, a computing device 104 may execute a client application 102. The client application 102 may include a web browser. The computing device 104 may include a physical computer and/or a mobile computing device such as a smart phone and/or similar ones. The computing device 104 may also include a special purpose and/or configured device that is optimized to execute data operations associated with the client application 102. For example, the computing device 104 may include physical components that are custom built to accelerate operations associated with a large dataset such as multiple computation cores tailored to process number of data streams associated with the large dataset.

The computing device 104 may execute the client application 102. The client application 102 may initiate operations to dynamically render the large dataset by identifying and retrieving an initial page of items 106 from the large dataset. The large dataset may include a variety of items with content including text, graphic, image, audio, and/or video, among others. The large dataset may be hosted and/or managed by the client application 102. The initial page of items 106 may be retrieved from a beginning of the large dataset. Alternatively, the initial page of items 106 may be generated from a previously rendered page of items associated with a previous interaction upon detecting a continuation of the previous interaction.

A number of the items to provide as the initial page of items 106 may be computed based on dimensions of a visible area of the client application 102. For example, the number of items may be selected and retrieved from the large dataset to generate the initial page of items 106 so that the content of the initial page of items 106 fit dimension(s) of the visible area. The content of the initial page of items 106 is deemed to fit the visible area when the initial page of items 106 maintains optimum readability as rendered in the visible area. Optimum readability may be defined by the computing device 104 to provide a consumer 110 with a font size or a graphic size sufficient for the consumer 110 to recognize the associated item. Optimum readability may also be configured by the consumer 110 to adjust up or down a font size and/or a graphic size of an item to render the item as recognizable.

Next, a consumed section of the visible area of the client application 104 may be measured to quantify utilization by the initial page of items 106. The consumed section may be compared to a remaining section of the visible area to detect how many more pages of items may be fit into the remaining section. Each adjacent page to be rendered in the remaining section of the visible area may include a same number of items as the initial page of items 106 (such as both the initial page of items 106 and the adjacent page(s) of items 108 have a same number columns of items). Next, adjacent page(s) of items 108 may be retrieved from the large dataset to render in the remaining section of the visible area based on how many of the adjacent page(s) of items 108 may fit the remaining section. The client application 102 may render the adjacent page(s) of items 108 in the remaining section of the visible area.

Furthermore, in response to a new action to display non-rendered pages of items, a subset of the non-rendered pages of items may be retrieved from the large dataset. The subset of non-rendered pages of items may retrieved from a location in the large dataset that corresponds to the forward or backwards movement associated with the new action. The number of the subset of the non-rendered pages of items may be determined based on the number of the initial page of items 106 and the adjacent page(s) of items 108. The initial page of items 106 and the adjacent page(s) of items 108 may be remove from the visible area. The subset of the non-rendered pages of items may be rendered in the visible area. In addition, the initial page of item 106 and the adjacent page(s) of items 108 may be replaced with a spacer. The spacer may serve as placeholder for initial page of items 106 and the adjacent page(s) of items 108. The spacer may be rendered in a virtual area of the client application 102. The spacer may be sized to accommodate a size of the initial page of items 106 and the adjacent page(s) of items 108.

The computing device 104 may communicate with other client device(s) or server(s) through a network. The network may provide wired or wireless communications between network nodes such as the computing device 104, other client device(s) and/or server(s), among others. Previous example(s) to dynamically rendering a large dataset in the client application 102 are not provided in a limiting sense. Alternatively, the large dataset may be hosted by an external provider and accessed by the client application 102, among others. Furthermore, a service hosted by a physical server may provide a client interface such as the client application 102 that dynamically renders the large dataset at the computing device 104.

The consumer 110 may interact with the client application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the client application 102, embodiments are not limited to these components or system configurations and can be implemented with other system configuration employing fewer or additional components.

Figure 2:
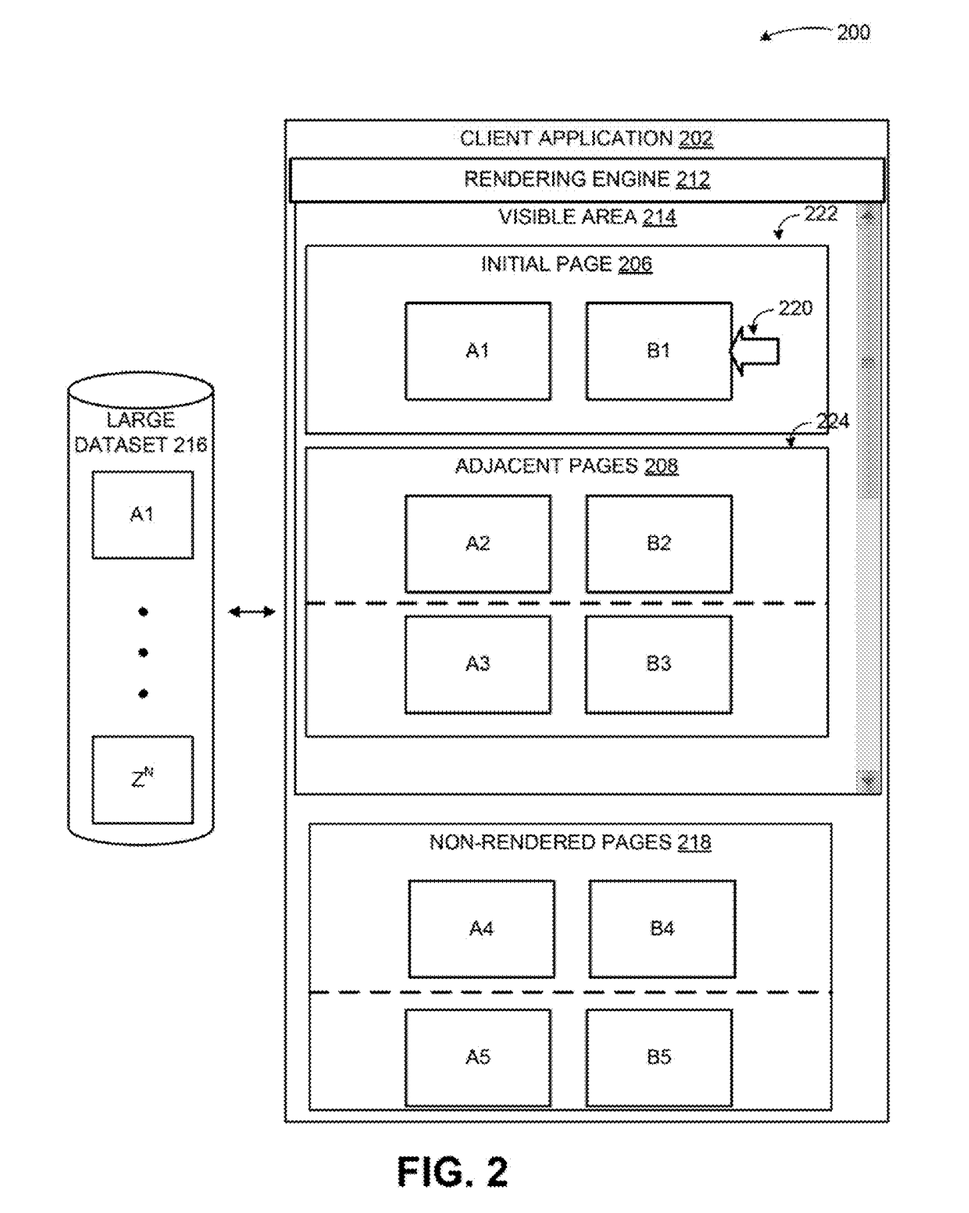
FIG. 2 is a display diagram illustrating example components of a client application that renders a large dataset, according to embodiments.

FIG. 2 is a display diagram illustrating example components of a client application that renders a large dataset, according to embodiments.

In a diagram 200, a rendering engine 212 of a client application 202 may interact with a large dataset 216 to render items A1 through $Z^N$ of the large dataset 216. The items may include a variety of content including (but not restricted to) text, graphical, image, video, and/or audio based content, among others. The large dataset 216 may be a hosted and managed by the client application 202. Alternatively, the large dataset 216 may be hosted and managed by an external party.

The rendering engine 212 may interact with the large dataset 216 to identify and retrieve an initial page of items 206 to render in a visible area 214 of the client application 202. A number of items may be selected from the large dataset 216 with content that may fit dimension(s) of the visible area 214. For example, content of the selected items A1 and B1 may be analyzed to confirm that the content fits the width and/or the height of the visible area 214 while maintaining an optimum or desired readability. The optimum readability may be a set of rules to present page(s) of items from the large dataset 216 to a consumer such that the consumer may recognize the items from a selection of A1 through $Z^N$ when viewing the visible area 215. To enforce optimum or desired readability, the rendering engine may increase and/or decrease a font size and a graphic size, among others associated with the content of individual items presented through a paginated structure in the visible area 214.

Next, the rendering engine 212 may measure a consumed section 222 of the visible area 214 utilized by the initial page of items 206. The rendering engine 212 may identify a remaining section 224 of the visible area 214 based on remaining space within the visible area 214 after accounting for the consumed section 222. Adjacent page(s) of items 208 may be retrieved from the large dataset 216 that may fit the remaining section 224 of the visible area 214. A number of adjacent page(s) of items to retrieve from the large dataset 216 may be computed by comparing the consumed section 222 to the remaining section 224 of the visible area 214. A resulting size comparison value may be used to compute the number of the adjacent page(s) of items 208. For example, if the remaining section 224 is twice the size of the consumed section 222 then two adjacent pages of items 208 may be retrieved from the large dataset 216.

The rendering engine 212 may consume resources to store non-rendered pages of items 218 while attempting to fill the visible area 215 with the initial page 206 of items and the adjacent page(s) of items 208. The non-rendered pages of items 218 may be stored and/or rendered in a virtual area of the client application 202. For example, a series of items from the large dataset 216 may be retrieved and stored in the non-rendered pages of items 218 as cache. Items from the non-rendered pages of items 218 may next be used to fill pages of items in the visible area 214 such as the initial page of items 206 and the adjacent page(s) of items 208.

Alternatively, the non-rendered pages of items 218 may also be used to fill available spots in the initial page of items 206 and/or the adjacent pages of items 208 in response to a resize action 220. The resize action 220 may make the initial page of items 206 and/or the adjacent page(s) of items 208 smaller and thus open available sections for items in the visible area 214. The resize action 220 may also make the initial page of items 206 and/or the adjacent page(s) of items 208 larger and therefore lead to displacement of items such as B1, B2, and/or 83 to be rendered outside the visible area 214. In such a scenario, the initial page of items 206, and/or the adjacent page(s) of items 208 may be re-allocated to remove the displaced items. The displaced items may be stored in cache within the non-rendered pages of items 218.

Figure 3:
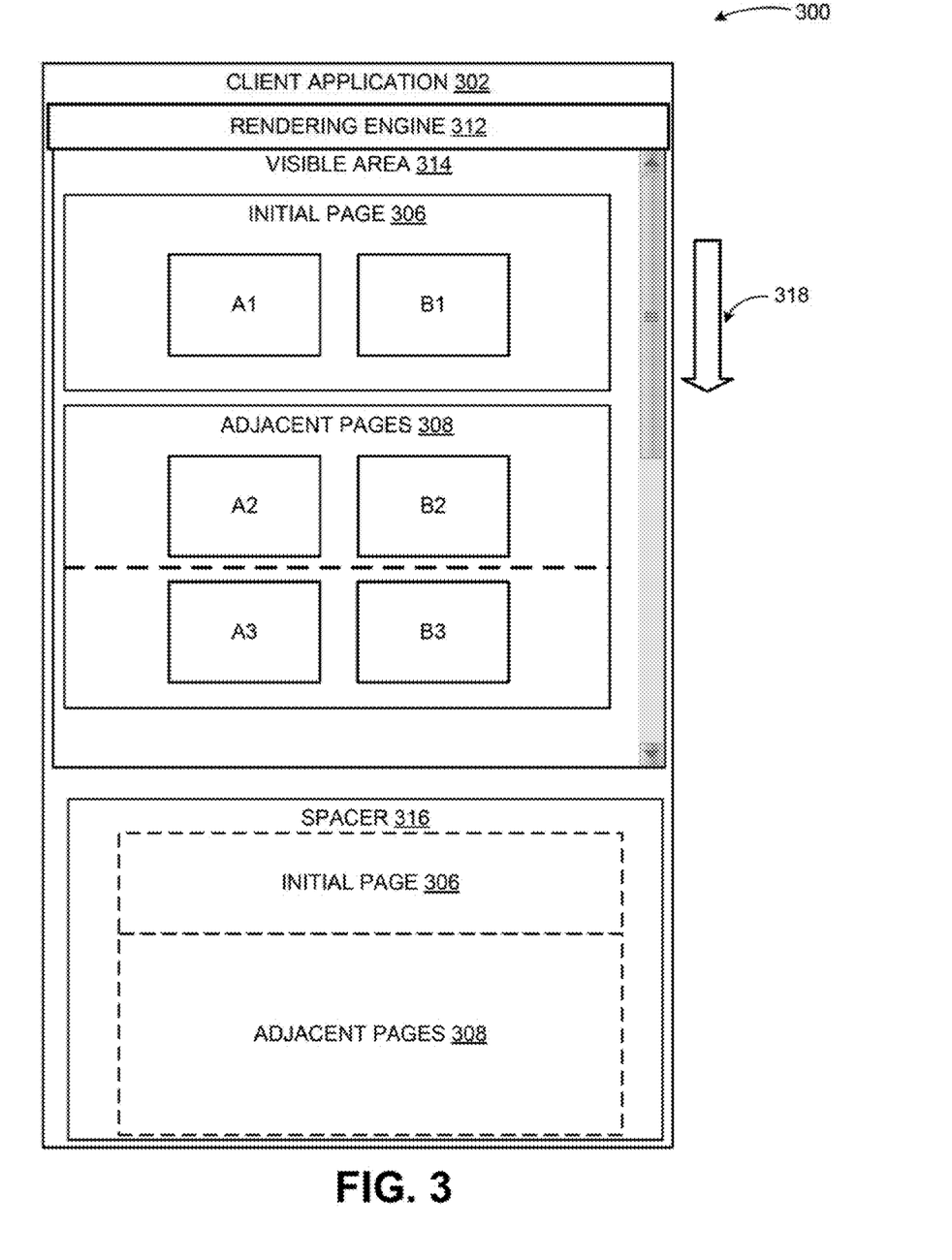
FIG. 3 is a display diagram illustrating components of a scheme to render a large dataset in a client application, according to embodiments.

FIG. 3 is a display diagram illustrating components of a scheme to render a large dataset in a client application, according to embodiments.

In a diagram 300, a rendering engine 312 of the client application 302 may render an initial page of items 306 in a visible area 314. A remaining section of the visible area 314 may be populated with adjacent page(s) of items 308. A number of page(s) of items to use as adjacent page(s) may be identified by comparing a consumed section of the visible area 314 with a remaining section of the visible area 314 that results in a size comparison value. The number of the adjacent page(s) of items 308 to insert into the remaining section is correlated to the size comparison value. For example, if the remaining section is three times a size of the consumed section than three of the adjacent page(s) of items 308 may be inserted into the remaining section of the visible area 314.

The rendering engine 312 may also create spacer(s) 316 to serve as placeholder(s) for non-rendered page(s) of items from the large dataset. The spacer(s) 316 may be rendered in a virtual area of the client application 302. Each of the spacer(s) 316 may be sized to accommodate a size of pages of items rendered in the visible area 314. For example, the spacer(s) 316 may be sized to accommodate a size of the initial page of items 306 of items and the adjacent page(s) of items 308. Spacer(s) 316 may be rendered in a virtual area of the client application 302 to allocate space for a size of each of the non-rendered pages of items from the large dataset.

Upon generating the spacer(s) 316, resources used to process non-rendered pages of items may be released. For example, memory used to store and manage the non-rendered pages of items may be unallocated. Similarly, processing resources used to process the non-rendered pages of items may be released.

The rendering engine 312 may respond to a scroll action 318 by retrieving a selection of the non-rendered pages of items from a location in the large dataset following a last page of the adjacent page(s) of items 308. Determining a number of the selection may be based on a content of the selection fitting dimension(s) of the visible area 314. For example, two non-rendered pages of items may be retrieved from the large dataset upon an analysis that shows the size of the content of the selection fitting the visible area 314 of the client application 302. The number of the selection may also be determined based on the content of the selection maintaining optimum or desired readability as rendered in the visible area 314.

Next, in response to the scroll action 318, the initial page of items 306 and the adjacent page(s) of items 308 may be removed from the visible area 314. The selection of the non-rendered pages of items may be rendered in the visible area 314. A spacer corresponding to the selection may also be removed to synchronize the spacer(s) 316 with the non-rendered pages of items from the large dataset. Furthermore, each of the spacer(s) 316 may be resized to accommodate a size of the selection of the non-rendered pages of items that were recently rendered. For example, if the selection includes two pages of items then a size of the spacer(s) 316 may be resized to accommodate the two pages of items. In such a scenario, new spacer(s) may be added to the spacer(s) 316 to accommodate the number of the non-rendered pages of items. Alternatively, when more pages of items are rendered in the visible area 314 (as a result of the scroll action 318 when compared the previously rendered pages of items), spacer(s) may be resized to accommodate the additional rendered pages. A number of spacer(s) 316 may also be removed to synchronize the spacer(s) to accommodate the non-rendered pages of items.

The rendering engine 312 may render the selection of the non-rendered pages within the visible area 314 upon removal of the initial page of items 306 and the adjacent page(s) of items 308. The initial page of item 306 and the adjacent page(s) of items 308 may be replaced with another spacer. The other spacer may serve as placeholder for the initial page of items 306 and the adjacent page(s) of items 308. The other spacer may be rendered in another virtual area of the client application 302. The other spacer may be sized to accommodate a size of the initial page of items 306 and the adjacent page(s) of items 308. In an example scenario, the other page virtual area may be situated above the visible area 314 in accordance with a direction of the scroll action 318.

Figure 4:
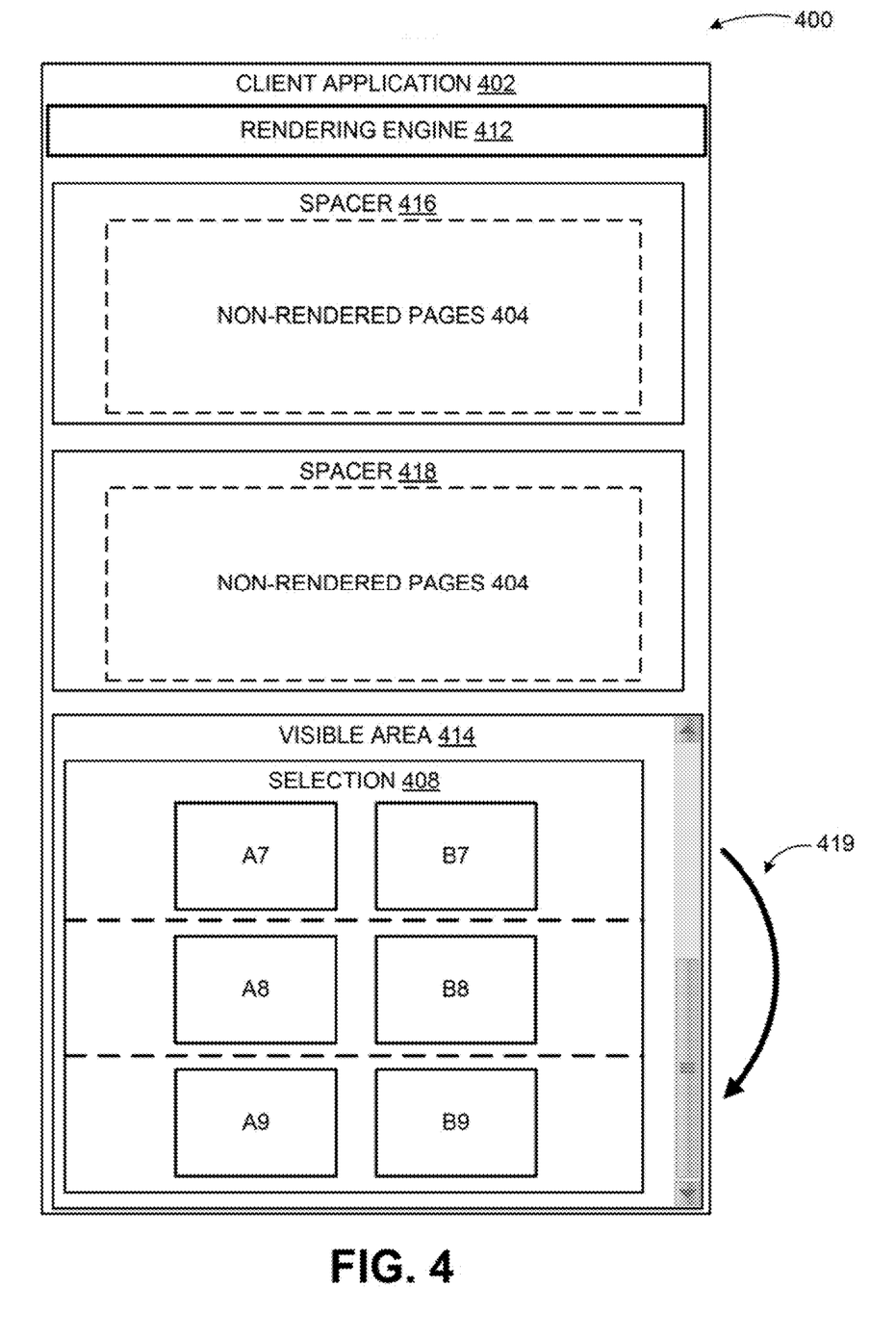
FIG. 4 is a display diagram illustrating a scheme to dynamically render remaining pages of items of the large dataset in response to a skip action, according to embodiments.

FIG. 4 is a display diagram illustrating a scheme to dynamically render remaining pages of items of the large dataset in response to a skip action, according to embodiments.

In a diagram 400, a rendering engine 412 of a client application 402 may detect a skip action 419. The skip action may pass over a subset of spacers such as a spacer 416 and a spacer 418. Both the spacer 416 and the spacer 418 may be sized to accommodate of a size of a selection of non-rendered pages 404. The rendering engine 412 may compute a number skipped pages of items by multiplying a spacer total of the spacer 416 and the spacer 418 with a visible page number. The visible page number may equal pages of items displayed in the visible area 414 prior to the skip action 419. For example, the visible page number may equal a page total of the initial page of items and the adjacent page(s) of items.

Next a selection 408 of non-rendered pages of items may be retrieved from a location in the large dataset after the skipped pages of items. The number of the selection 408 may be determined by dynamically fitting a content of the selection into the visible area 414. The rendering engine may also render the selection in the visible area 414. However, if the rendering engine fails to render a portion of the selection because of insufficient space in the visible area 414, then the spacers may be resized to accommodate a size of the portion of the selection that is rendered in the visible area 414.

As discussed above, the client application may be employed to dynamically render the large dataset. An increased user efficiency with the client application 102 may occur as a result of processing items to render dynamically in paginated structures. Additionally, using spacers in virtual areas of the client application instead of pages of items loaded in memory, by the client application 102, may reduce processor load, increase processing speed, conserve memory, and reduce network bandwidth usage.

Embodiments, as described herein, address a need that arises from a lack of efficiency to dynamically render a large dataset in a client application. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Dynamically rendering a large dataset in a client application may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
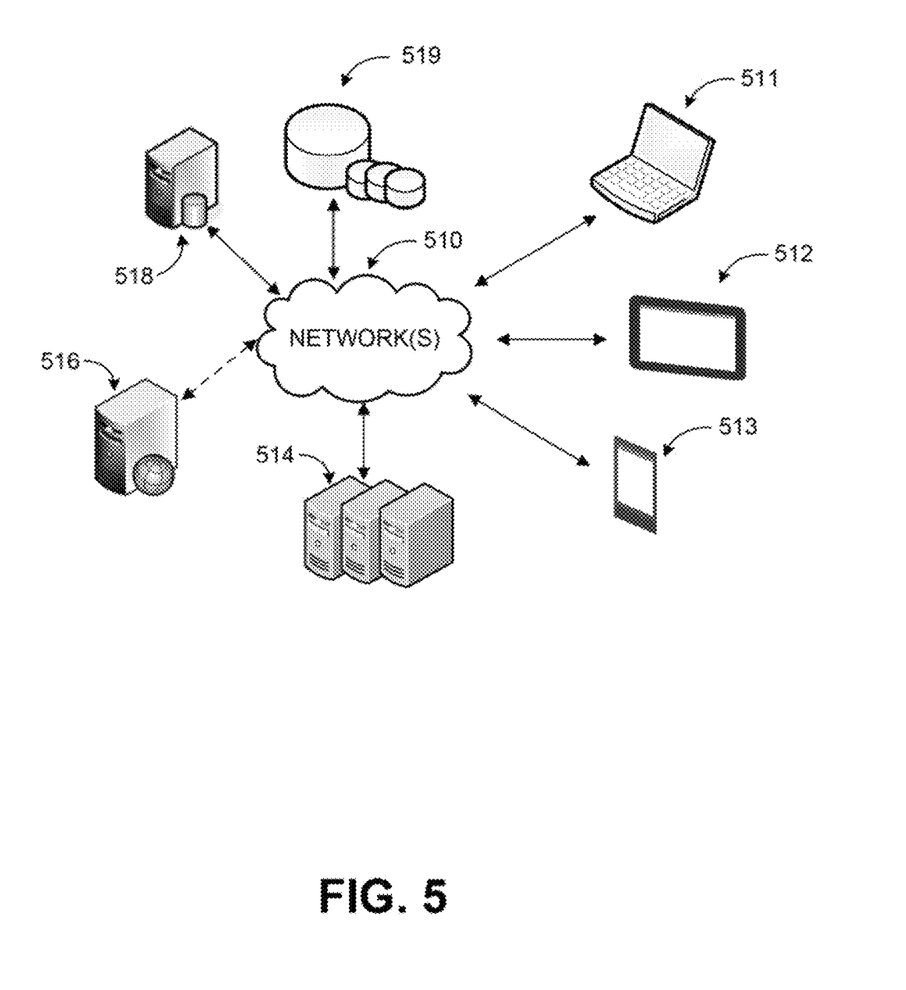
FIG. 5 is a simplified networked environment, where a system according to embodiments may be implemented.

FIG. 5 is an example networked environment, where embodiments may be implemented. A client application configured to dynamically render a large dataset may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A client application may identify and retrieve an initial page of items from a large dataset to render in a visible area. The initial page of items may be rendered and dynamically sized. A consumed section of the visible area may be measured to detect utilization by the initial page of items. Adjacent page(s) of items may be retrieved from the large dataset to render in a remaining section of the visible area determined based on the consumed section. The client application may store data associated with the page of items in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to dynamically render a large dataset in a client application. Furthermore, the networked environments discussed in FIG. 5 are for illustration purposes only. Embodiments are not limited to the example applications, modules, or processes.

Figure 6:
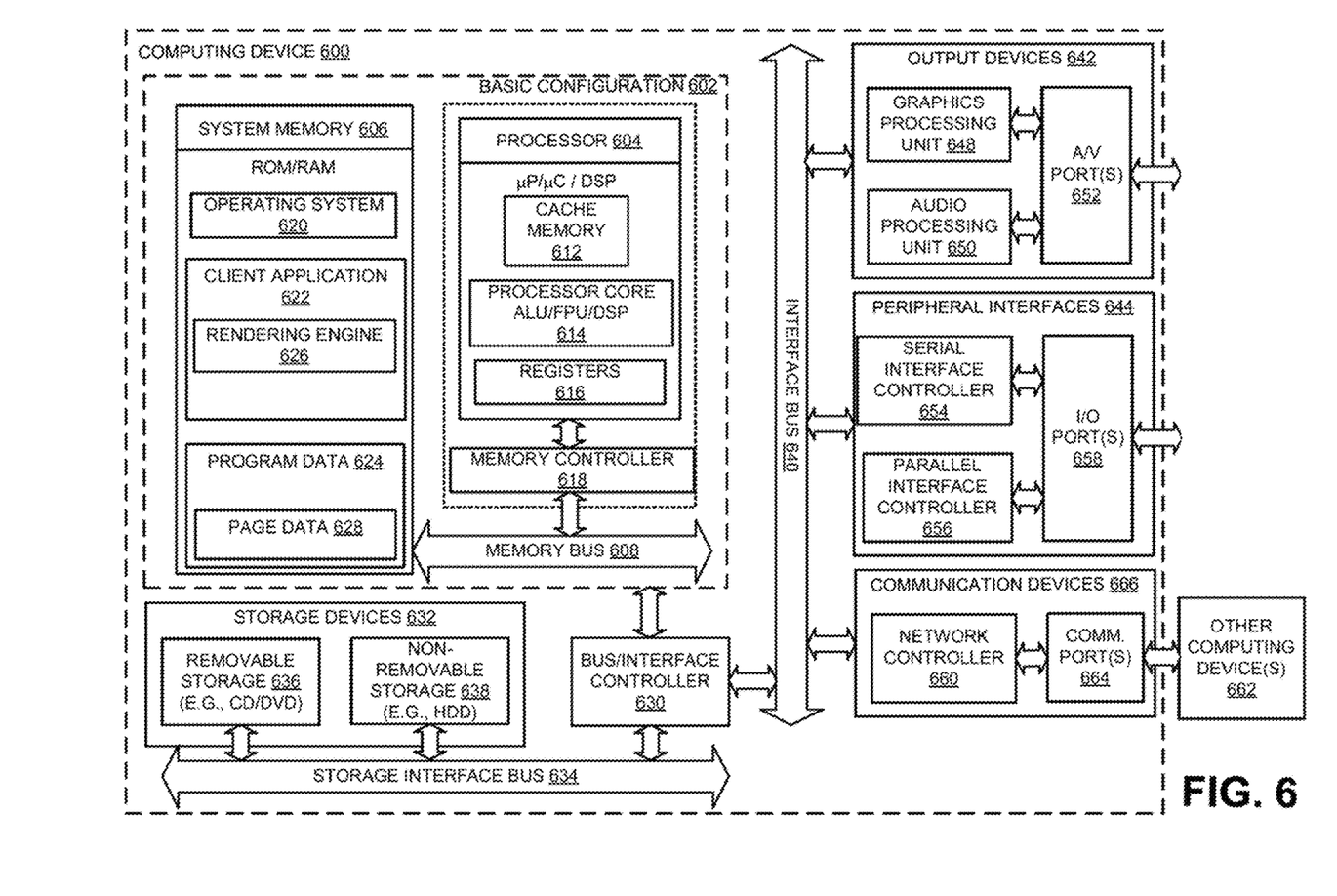
FIG. 6 is a block diagram of an example computing device, which may be used to dynamically render a large dataset in a client application, according to embodiments.

FIG. 6 is a block diagram of an example computing device, which may be used to dynamically render a large dataset in a client application, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a client application 622, and a program data 624. The client application 622 may include components such as a rendering engine 626. The rendering engine 626 may execute the processes associated with the client application 622. The rendering engine 626 may identify and retrieve an initial page of items from a large dataset to render in a visible area. The initial page of items may be rendered and dynamically sized. A consumed section of the visible area may be measured to detect utilization by the initial page of items. Adjacent page(s) of items may be retrieved from the large dataset to render in a remaining section of the visible area determined based on the consumed section.

The client application 622 may display the large dataset as page of items through a display component associated with the computing device 600. An example of the display component may include a monitor, and/or a touch screen, among others that may be communicatively coupled to the computing device 600. The program data 624 may also include, among other data, page data 628, or the like, as described herein. The page data 628 may include items from the large dataset.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to dynamically render a large dataset in a client application. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
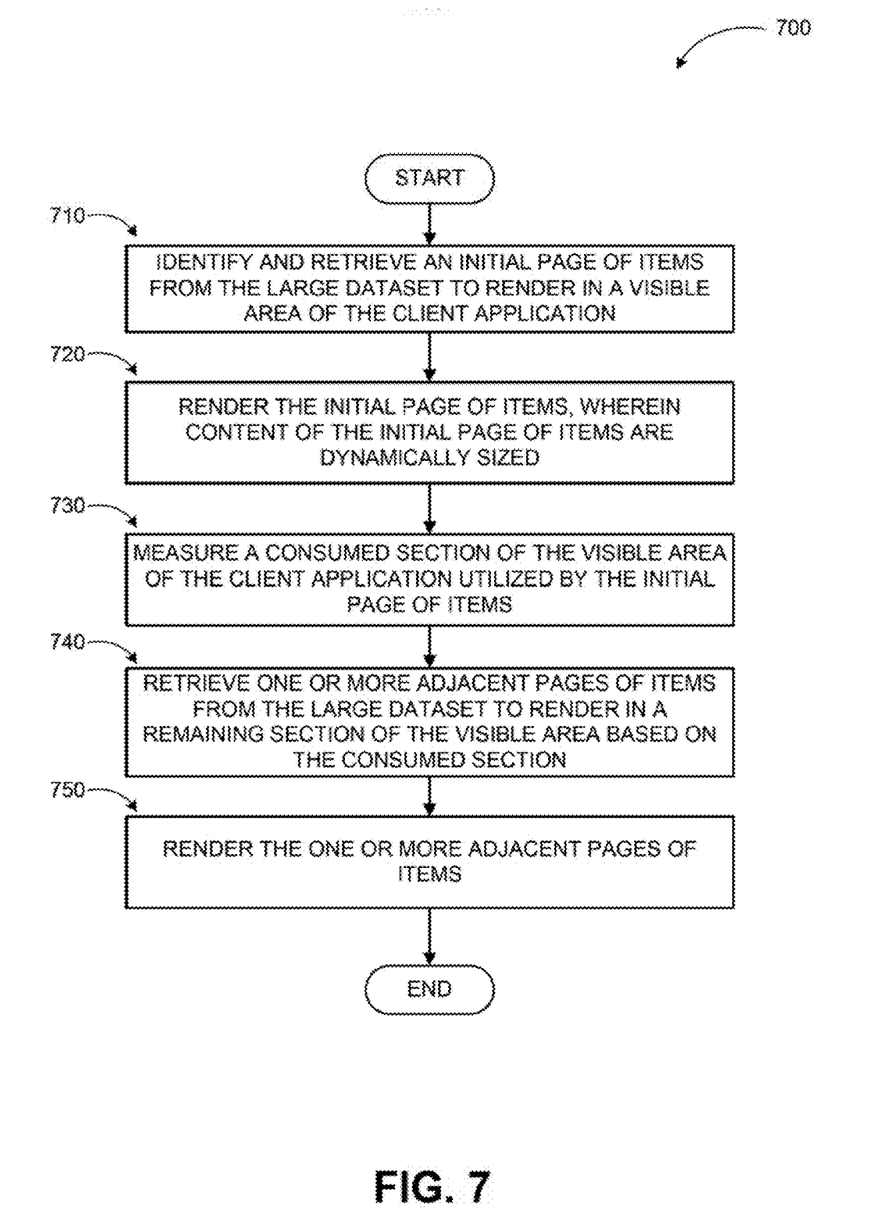
FIG. 7 is a logic flow diagram illustrating a process for dynamically rendering a large dataset in a client application, according to embodiments.

FIG. 7 is a logic flow diagram illustrating a process for dynamically rendering a large dataset in a client application, according to embodiments. Process 700 may be implemented on a computing device, such as the computing device 600 or another system.

Process 700 begins with operation 710, where the client application identifies and retrieves an initial page of items from a large dataset to render in a visible area. The number of the items to produce the initial page may be determined based on how the items fit the dimensions of the visible area. Next, at operation 720, the initial page of items are rendered. The content of the initial page of items are dynamically sized.

At operation 730, a consumed section of the visible area is measured to determine a utilization by the initial page of items. The consumed section may be compared to a remaining section of the visible area to quantify a number of adjacent pages of items to retrieve from the large dataset. At operation 740, the adjacent pages of items may be retrieved from the large dataset to render in the remaining section of the visible area based on the consumed section. The adjacent items may be rendered on the remaining section of the visible area in operation 750.

The operations included in process 700 is for illustration purposes. Dynamically rendering a large dataset in a client application may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device to dynamically render a large dataset in a client application is described. The computing device includes a display component, a memory configured to store instructions associated with the client application, and a processor coupled to the memory and the display component. The processor executes the client application in conjunction with the instructions stored in the memory. The client application includes a rendering engine. The rendering engine is configured to identify and retrieve an initial page of items from the large dataset to render in a visible area of the client application, render, on the display component, the initial page of items, where content of the initial page of items is dynamically sized, measure a consumed section of the visible area of the client application utilized by the initial page of items, retrieve one or more adjacent pages of items from the large dataset to render in a remaining section of the visible area based on the consumed section, and render, on the display component, the one or more adjacent pages of items.

In other examples, the initial page of items are identified with operation(s) to measure one or more dimensions of the visible area and analyze the content of the initial page of items to detect a number of items for the initial page of items that fit the one or more dimensions of the visible area, where the content of the initial page of items maintain optimum readability as rendered in the visible area. The rendering engine is further configured to detect a continued action associated with a previous interaction with the large dataset, identify a previously rendered page of items from the large dataset, where the previously rendered page of items is rendered in response to the previous interaction, and assign the previously rendered page of items to the initial page of items.

In further examples, the rendering engine is further configured to compare a first size of the consumed section of the visible area to a second size of the remaining section of the visible area to compute a size comparison value and compute a number of the one or more adjacent pages of items based on a correlation with the size comparison value. The rendering engine is further configured to generate one or more spacers based on one or more non-rendered pages of items from the large dataset, where a size of each of the one or more spacers is configured to accommodate a size of the initial page of items and a size of the one or more adjacent pages of items and render the one or more spacers in a non-visible area of the client application. The rendering engine is further configured to release one or more resources used to process the one or more non-rendered pages of items.

In other examples, the rendering engine is further configured to detect a scroll action, retrieve a selection of the one or more non-rendered pages of items from the large dataset, and render, on the display component, the selection of the one or more non-rendered pages of items. A content of the selection of the one or more non-rendered pages of items fit one or more dimensions of the visible area. A content of the selection of the non-rendered pages of items maintain optimum readability as rendered in the visible area. The selection of the one or more non-rendered pages of items are retrieved from a location in the large dataset that follows a last page of the one or more adjacent pages. The rendering engine is further configured to resize each of the one or more spacers to accommodate a size of the selection of the one or more non-rendered pages of items.

In some examples, a method executed on a computing device to dynamically render a large dataset in a client application is described. The method includes identifying and retrieving an initial page of items from the large dataset to render in a visible area of the client application, rendering the initial page of items, where content of the initial page of items is dynamically sized, measuring a consumed section of the visible area of the client application utilized by the initial page of items, retrieving one or more adjacent pages of items from the large dataset to render in a remaining section of the visible area based on the consumed section, rendering the one or more adjacent pages of items, and generating one or more spacers based on one or more non-rendered pages of items from the large dataset, where a size of each of the one or more spacers is configured to accommodate a size of the initial page and a size of the one or more adjacent pages.

In other examples, the method further includes detecting a skip action passing over a subset of the one or more spacers and computing a number of skipped pages of items from the large dataset by multiplying a spacer total of the subset of the one or more spacers with a visible page number, where the visible page number equals a page total of the initial page of items and the one or more adjacent pages of items. The method further includes retrieving a selection of the one or more non-rendered pages of items from a location in the large dataset after the skipped pages of items and rendering the selection of the one or more non-rendered pages of items. The method further includes detecting a failure to render a first subset of the selection, where the first subset does not fit the visible area of the client application and resizing each of the one or more spacers to accommodate a size of a second subset of the selection, where the second subset fit the visible area of the client application.

In further examples, the method further includes detecting a resize action on a selected item from the initial page or the one or more adjacent pages and dynamically adjusting one or more sizes of other items of the initial page or the one or more adjacent pages. The method further includes detecting an available section to add a new page of items to the visible area, retrieving the new page of items from a location in the large dataset after a last page of the one or more adjacent pages of items, rendering the new page of items following the one or more adjacent pages of items, and resizing each of the one or more spacers to accommodate a size of the initial page of items, a size of the one or more adjacent pages of items, and a size of the new page of items.

In some examples, a computer-readable memory device with instructions stored thereon to dynamically render a large dataset in a client application is described. The instructions include actions that are similar to actions of the method.

In some examples, a means for dynamically rendering a large dataset in a client application is described. The means for dynamically rendering a large dataset in a client application includes a means for identifying and retrieving an initial page of items from the large dataset to render in a visible area of the client application, a means for rendering the initial page of items, where content of the initial page of items is dynamically sized, a means for measuring a consumed section of the visible area of the client application utilized by the initial page of items, a means for retrieving one or more adjacent pages of items from the large dataset to render in a remaining section of the visible area based on the consumed section, and a means for rendering the one or more adjacent pages of items.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to dynamically render a large dataset in a client application, the computing device comprising:
   a memory configured to store instructions associated with the client application; and
   a processor coupled to the memory, the processor executing the client application in conjunction with the instructions stored in the memory, wherein the processor is configured to:
      identify a first group of items from the large dataset to render as an initial page in a visible area of a user interface (UI) of the client application;
      retrieve the first group of items from the large dataset;
      render the initial page of the first group of items on the UI, wherein the initial page consumes a portion of the visible area of the UI;
      measure the portion of the visible area of the UI consumed by the initial page;
      retrieve one or more additional groups of items from the large dataset to render in a remaining portion of the visible area of the UI as one or more adjacent pages based on the measurement;
      render the one or more adjacent pages of the one or more additional groups of items on the remaining portion of the visible area of the UI; and
      in response to detecting a scroll action;
         determine further groups of items for a number of one or more non-rendered pages to be retrieved from the large dataset based on a size of the rendered initial page and a size of the rendered one or more adjacent pages;
         cache the size of the rendered initial page and the size of the rendered one or more adjacent pages in a spacer;
         remove the rendered initial page and the rendered one or more adjacent pages from the UI; and
         render the retrieved further groups of items on the UI;
      in response to detecting a skip action passing over a subset of one or more spacers:
         compute a number of skipped pages from the large dataset by multiplying a total of the subset of the one or more spacers with a visible page number, wherein the visible page number equals a page total of the initial page and the one or more adjacent pages;
         retrieve a selection of the one or more non-rendered pages from a first location in the large dataset after the skipped pages; and
         render the selection of the one or more non-rendered pages.

2. The computing device of claim 1, wherein the first group of items are identified with one or more operations to:
   measure one or more dimensions of the visible area of the UI; and
   analyze a content of the first group of items to detect a number of items for the initial page that fit the one or more dimensions of the visible area, wherein the content of the first group of items maintains optimum readability as rendered in the visible area of the UI.

3. The computing device of claim 1, wherein the processor is further configured to:
   detect a continued action associated with a previous interaction with the large dataset;

identify a previously rendered group of items from the large dataset, wherein the previously rendered group of items is rendered in response to the previous interaction; and
assign the previously rendered group of items to the initial page.

4. The computing device of claim 1, wherein the processor is further configured to:
compare a first size of the consumed portion of the visible area of the UI to a second size of the remaining portion of the visible area of the UI to compute a size comparison value; and
compute a number of the one or more adjacent pages based on the size comparison value.

5. The computing device of claim 1, wherein the processor is further configured to:
generate the one or more spacers based on the one or more non-rendered pages from the large dataset, wherein a size of each of the one or more spacers is configured to accommodate the size of the initial page and the size of the one or more adjacent pages; and
render the one or more spacers in a non-visible area of the client application.

6. The computing device of claim 1, wherein the processor is further configured to:
release one or more resources used to process the one or more non-rendered pages.

7. The computing device of claim 1, wherein a content of the selection of the one or more non-rendered pages fits one or more dimensions of the visible area of the UI.

8. The computing device of claim 1, wherein a content of the selection of the one or more non-rendered pages maintains optimum readability as rendered in the visible area of the UI.

9. The computing device of claim 1, wherein the selection of the one or more non-rendered pages are retrieved from a second location in the large dataset that follows a last page of the one or more adjacent pages.

10. The computing device of claim 1, wherein the processor is further configured to:
resize each of the one or more spacers to accommodate a size of the selection of the one or more non-rendered pages.

11. A method executed on a computing device to dynamically render a large dataset in a client application, the method comprising:
identifying a first group of items from the large dataset to render as an initial page in a visible area of a user interface (UI) of the client application;
retrieving the first group of items from the large dataset;
rendering the initial page of the first group of items on the UI, wherein the initial page consumes a portion of the visible area of the UI; and
measuring the portion of the visible area of the UI consumed by the initial page;
retrieving one or more additional groups of items from the large dataset to render in a remaining portion of the visible area of the UI as one or more adjacent pages based on the measurement;
rendering the one or more adjacent pages of the one or more additional groups of items on the remaining portion of the visible area of the UI;
in response to detecting a scroll action:
determining further groups of items for a number of one or more non-rendered pages to be retrieved from the large dataset based on a size of the rendered initial page and a size of the rendered one or more adjacent pages;
caching the size of the rendered initial page and the size of the rendered one or more adjacent pages in a spacer;
removing the rendered initial page and the rendered one or more adjacent pages from the UI; and
rendering the retrieved further groups of items on the UI;
in response to detecting a skip action passing over a subset of one or more spacers:
computing a number of skipped pages from the large dataset by multiplying a total of the subset of the one or more spacers with a visible page number, wherein the visible page number equals a page total of the initial page and the one or more adjacent pages;
retrieving a selection of the one or more non-rendered pages from a first location in the large dataset after the skipped pages; and
rendering the selection of the one or more non-rendered pages.

12. The method of claim 11, further comprising:
detecting a failure to render a first subset of the selection of the one or more non-rendered pages, wherein the first subset does not fit the visible area of the UI; and
resizing each of the one or more spacers to accommodate a size of a second subset of the selection of the one or more non-rendered pages, wherein the second subset fits the visible area UI.

13. The method of claim 11, further comprising:
detecting a resize action on a selected item from the initial page or the one or more adjacent pages; and
dynamically adjusting one or more sizes of other items of the initial page or the one or more adjacent pages based on the resize action.

14. The method of claim 13, further comprising:
detecting an available section to add a new page to the visible area of the UI;
retrieving the new page from a second location in the large dataset after a last page of the one or more adjacent pages;
rendering the new page following the one or more adjacent pages; and
resizing the one or more spacers to accommodate the size of the initial page, the size of the one or more adjacent pages, and a size of the new page.

15. A physical computer-readable memory device with instructions stored thereon to dynamically render a large dataset in a client application, the instructions comprising:
identifying a first group of items from the large dataset to render as an initial page in a visible area of a user interface (UI) of the client application;
retrieving the first group of items from the large dataset;
rendering the initial page of the first group of items on the UI, wherein the initial page consumes a portion of the visible area of the UI;
measuring the portion of the visible area of the UI consumed by the initial page;
retrieving one or more additional groups of items from the large dataset to render in a remaining portion of the visible area of the UI as one or more adjacent pages based on the measurement;
rendering the one or more adjacent pages of the one or more additional groups of items on the remaining portion of the visible area of the UI; and in response to detecting a scroll action:
   determining further groups of items for a number of one or more non-rendered pages to be retrieved from the large dataset based on a size of the rendered initial page and a size of the rendered one or more adjacent pages;
   caching the size of the rendered initial page and the size of the rendered one or more adjacent pages in a spacer;
   removing the rendered initial page and the rendered one or more adjacent pages from the UI; and
   rendering the retrieved further groups of items on the UI;

in response to detecting a skip action passing over a subset of one or more spacers:
   computing a number of skipped pages from the large dataset by multiplying a total of the subset of the one or more spacers with a visible page number, wherein the visible page number equals a page total of the initial page and the one or more adjacent pages;
   retrieving a selection of the one or more non-rendered pages from a location in the large dataset after the skipped pages; and
   rendering the selection of the one or more non-rendered pages.

16. The computer-readable memory device of claim 15, wherein the instructions further comprise:
   releasing one or more resources used to process the one or more non-rendered pages.

* * * * *